Oct. 20, 1959 S. C. BRITTON 2,909,159
DUAL FUEL DIESEL ENGINES
Filed Nov. 26, 1954
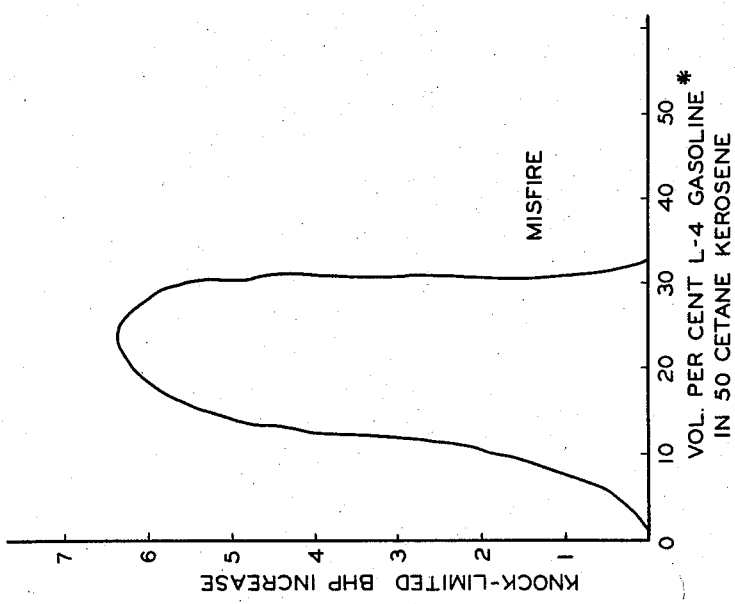
INVENTOR.
S. C. BRITTON
BY Hudson and Young
ATTORNEY

United States Patent Office 2,909,159
Patented Oct. 20, 1959

2,909,159

DUAL FUEL DIESEL ENGINES

Sylvester C. Britton, Bartlesville, Okla., assignor to Phillips Petroleum Company, a corporation of Delaware Application November 26, 1954, Serial No. 471,346

9 Claims. (Cl. 123—1)

This invention relates to dual fuel diesel engines. In one of its more specific aspects it relates to a method for operating a duel fuel diesel engine utilizing a pilot charge comprising fuel oil and gasoline in order to obtain improved combustion and increased power. In still another of its more specific aspects, it relates to a method for operating a dual fuel diesel engine so as to obtain increased knock-limited brake horsepower when employing natural gas fuel contaminated with components which increase the knock tendency of the engine. In still another more specific aspect, it relates to an improved fuel mixture for use as a pilot charge in a dual fuel diesel engine.

Dual fuel diesel engines possess the high thermal efficiency of diesel or compression ignition engines while utilizing a gas as a fuel. Because in many localities natural gas may be the cheapest fuel available, the ability of the dual fuel diesel engine to utilize gas constitutes a definite advantage. And even where the price of gas may be high, the price of fuel oil may be relatively higher per unit of heating value. An additional advantage in using gas as a fuel lies in the fact that service interruptions need not ocur in the event of a reduction or failure of gas supply. Thus, the dual fuel engine can operate at one extreme as a conventional diesel engine and at the other extreme as a compression ignition engine which employs gas as the primary fuel and uses fuel oil only as a means for ignition. For example, when used in oil fields with portable drill rigs, the same engine can be employed in various locations burning primarily gas, primarily diesel fuel, or various combinations of the two as circumstances may warrant.

Dual fuel diesel engines have been used extensively in petroleum fields where an abundant source of gaseous hydrocarbon, particularly natural gas, is available. It has been found, however, that operation with oil field natural gas is not always satisfactory. In some instances, especially when the natural gas utilized as the gaseous fuel contains substantial quantities of butane, propane or hydrogen sulfide, the knock-limited brake horsepower of the engine is reduced as a result of the occurrence of destructive combustion in the cylinders of the engine. Similar poor operation has also resulted when employing refinery gaseous hydrocarbon streams of propane or an admixture of methane and ethane contaminated with minor quantities of butane, propane, propylene and/or hydrogen sulfide. An investigation of dual fuel diesel engine performance has indicated that the development of poor combustion and the resulting reduction in power is the result of detonation of the higher molecular weight hydrocarbon components of some gaseous fuels in the end gases in the cylinders of the engine.

Gas-air mixtures in proportion suitable to the power requirements of a dual fuel diesel engine cannot be ignited by compression as in the case of a diesel or compression ignition engine. In conventional dual fuel diesel engines, a homogeneous and lean mixture of gas and air is compressed to a high temperature and pressure and ignited by injecting a small pilot charge of fuel oil. This type of engine is usually started on straight diesel fuel using a diesel fuel charge substantially larger than the pilot charge. After operation of the engine has been established, the volume of the diesel fuel charge is reduced to the pilot charge at which time the gaseous hydrocarbon fuel is supplied to the engine. In accordance with the present invention, an improved fuel mixture is provided for use as a pilot charge in dual fuel diesel engines.

The following are objects of the invention.

It is an object of this invention to provide an improved method for operating dual fuel diesel engines.

Another object of the invention is to provide an improved method for operating a dual fuel diesel engine so as to obtain improved combustion and increased power.

Still another object of the invention is to provide an improved method for operating a dual fuel diesel engine utilizing a natural gas fuel contaminated with components which increase the knock tendency of the engine.

A further object of the invention is to provide an improved fuel mixture for use as a pilot charge in dual fuel diesel engines.

Other and further objects and advantages of the invention will become apparent to one skilled in the art upon referring to the following disclosure.

Broadly speaking, the present invention resides in a pilot charge comprising fuel oil and gasoline for use in a dual fuel diesel engine and in a method of operating such an engine utilizing this pilot charge. By operating a dual fuel diesel engine using the pilot charge of this invention, the knock-limited power output of the engine is increased through the improvement in combustion obtained by reducing the tendency of detonation to occur in the engine. When operating on a gaseous fuel such as natural gas contaminated with propane, propylene or butene, the method of my invention increases the knock-limited brake horsepower of the engine and permits the rate of continuous power of the engine to be secured when the performance of the engine would otherwise be below rated value. Additionally, the method of this invention not only increases the knock-limited brake horsepower of a dual fuel diesel engine but also permits operation of the engine at rated continuous power on a gaseous hydrocarbon fuel comprising essentially propane. The attainment of a power output higher than the continuous power of the engine when utilizing dry natural gas as a fuel is also possible when operating the engine utilizing the pilot charge of this invention.

A more complete understanding of the invention may be obtained by reference to the following discussion and the drawing, in which:

Figure 1 is a graph illustrating the increase in knock-limited brake horsepower resulting from utilizing the pilot charge of this invention; and Figure 2 is a graph showing the relationship between knock-limited brake horsepower and different pilot charges containing various amounts of gasoline.

I have discovered that the combustion process in a dual fuel diesel engine, and concomitantly the knock-limited brake horsepower of the engine, can be greatly improved by utilizing as the pilot charge a suitable mixture of diesel fuel, e.g., an oil having an initial boiling point of from about 300° F. to about 370° F. and an end boiling point within the range of from about 510° F. to about 670° F., and gasoline. While it is preferred to use a leaded gasoline, e.g., one containing between about 1.5 and 4.0 milliliters of tetraethyl lead per gallon, it is to be understood that an unleaded gasoline can be utilized as well. It has been found that the addition of a gasoline to diesel fuel in an amount in the range of about 10 to 30 volume percent of the diesel fuel results in a pilot charge which gives a significant increase in knock-limited brake horsepower. The increase in knock-limited brake horsepower obtainable by utilizing a pilot charge mixture comprising fuel oil and gasoline is illustrated graphically in Figures 1 and 2. Reference to Figures 1 and 2 indicates that when between about 10 and 30 volume percent gasoline is utilized a substantial increase in knock-limited brake horsepower is obtained. It is noted that for volumes greater than about 30 volume percent gasoline the knock-limited brake horsepower decreases rapidly, indicating that the pilot charge does not ignite the gaseous fuel when greater amounts of gasoline are used.

The amount of the pilot charge used in the operation of dual fuel diesel engines is maintained as small as possible commensurate with obtaining the desired ignition of the gaseous fuel charge. The desirability of using a small pilot charge becomes evident when it is considered that when gas is available, use of even a small amount of a pilot charge becomes in comparison expensive. Accordingly, the pilot charge constitutes generally between about 5 and about 25 percent of the total B.t.u. input at full load and remains at this value for all loads. The upper end of the aforementioned range, e.g., between about 17 and 25 percent, is applicable to the operation of higher speed engines. More specifically, it has been found that satisfactory operation is obtained when using between about 10 and 15 cu. mm. of pilot charge for each injection of gaseous fuel.

It is also within the contemplation of the invention to utilize water injection in conjunction with the operation of dual fuel diesel engines utilizing the pilot charge of this invention. In accordance with this aspect of the invention, water is injected into the intake air stream.

The pilot charge of this invention may be used in any dual fuel diesel engine employing any well known gas as the fuel such as wet or dry natural gas, refinery gas, manufactured gas, propane, and the like. Accordingly, the pilot charge may be used in conjunction with the operation of either 2-stroke cycle or 4-stroke cycle dual fuel diesel engine.

In a 2-stroke cycle dual fuel diesel engine, the entire cycle is completed in one revolution of the crank shaft. The pilot charge is sprayed into hot compressed air and gaseous fuel starting the combustion and liberating the energy for the power stroke which follows. In a "uniflow" scavenged engine, sometime prior to the end of the power stroke the exhaust valve opens, allowing most of the combustion products to escape into the exhaust manifold. Shortly thereafter the intake ports open, permitting air and gaseous fuel to be forced into the cylinder. Sometime after bottom dead center, the intake ports close, and shortly thereafter the exhaust valve closes. In the case of a "loop" scavenged engine, the piston uncovers an opening in the piston cylinder wall near the end of the power stroke, permitting most of the combustion products to escape into the exhaust manifold. Immediately afterward in the stroke, a second port in the cylinder wall is uncovered by the piston, allowing air and gaseous fuel to be forced into the cylinder. The return stroke of the piston is the compression stroke of the cycle. It is also within the scope of the invention to compress air alone on the compression stroke and then simultaneously inject the gaseous fuel and the pilot charge into the engine through one injection valve.

In a 4-stroke cycle dual fuel diesel engine, two revolutions of the crank shaft are required for each power stroke. During an intake stroke, air and gaseous fuel are inducted into the cylinder and thereafter compressed during a compression stroke to raise the temperature to one higher than the ignition point of the pilot charge. The pilot charge is injected into the cylinder slightly before the end of the compression stroke, thereby igniting the gaseous fuel which burns during an expansion or power stroke. The resulting combustion products are purged from the cylinder during an exhaust stroke. In both types of engines, part load is secured by reducing the gas pressure, thereby increasing the air-fuel ratio. If the air-fuel ratio by weight exceeds about 40 to 1, the flame may be extinguished in part as evidenced by unburned gas in the exhaust.

A more comprehensive understanding of the invention may be obtained by reference to the following illustrative examples which are not intended, however, to be unduly limitative of the invention.

EXAMPLE I

A General Motors 3–71 dual fuel diesel engine was used in tests to determine the effect of using the pilot charge of this invention when operating the engine on various gaseous hydrocarbons fuels. The engine consisted of the three cylinder, 2-stroke cycle, 16:1 compression ratio, GM 3–71 diesel engine modified for dual fuel operation. The dual fuel modifications consisted of the replacement of the standard fuel injector with a DF–60 unit injector for introducing the smaller pilot fuel charge, replacement of the air box handhole covers with special gas manifold handhole covers and modification of each cylinder liner to provide for the attachment of gas nozzles. The governor was also redesigned to accommodate gaseous fuel. The gaseous hydrocarbon fuels were metered and introduced to the fuel manifold through hand pressure regulators which by-passed the engine gas governor to permit overloading of the engine. Incipient detonation was detected by the Phillips 66 Electronic Gating Knockmeter and E–1 Detonation Pickup.

The following test fuels were utilized in conducting the tests:
(1) Propane—technical grade.
(2) N-Butane—technical grade.
(3) Natural gas—specific gravity—0.66.
(4) Pilot oil—kerosene, 51.4 cetane number and 538 F. end point.
(5) Regular gasoline—80 percent straight run and 20 percent catalytically cracked stock, 82.4 Research octane number and 2.77 ml. TEL per gallon.
(6) Paraffinic type gasoline—3 percent n-butane, 11 percent iso-pentane, 20 percent technical n-hexane, 22 percent ASTM n-heptane, 44 percent HF heavy alkylate fraction (271–416 F. boiling range), 78.7 Research octane number and 3.02 ml. TEL per gallon.

The results of the tests are indicated below in Tables 1, 2 and 3. In all of the tests injection of the pilot charge was started at about 12° before top dead center

*Table 1*

EFFECT OF REGULAR GASOLINE CONCENTRATION IN PILOT OIL WITH PROPANE AS PRIMARY FUEL

| Run | 1 | 2 | 3 | 4 | 5 |
|---|---|---|---|---|---|
| Engine Speed (r.p.m.) | 1,600 | 1,600 | 1,600 | 1,600 | 1,600 |
| Load (lbs.) | 121 | 133 | 131 | 124 | 121 |
| B.H.P. | 64.5 | 70.9 | 69.8 | 66.2 | 64.5 |
| B.H.P. Increase, percent | | 9.9 | 8.2 | 2.6 | 0 |
| Vol. Gasoline in Pilot Oil (percent) | 0 | 25.0 | 20.0 | 10.0 | 3.3 |
| Temperatures (° F.): | | | | | |
| Propane Gas | 88 | 105 | 120 | 120 | 96 |
| Water Out | 200 | 200 | 200 | 200 | 200 |
| Lube Oil Sump | 196 | 200 | 200 | 200 | 201 |
| Wet Bulb | 72 | | | | 72 |
| Dry Bulb | 82 | | | | 82 |
| Exhaust Cyl.— | | | | | |
| 1 | 625 | 700 | 700 | 650 | 620 |
| 2 | 690 | 800 | 800 | 730 | 690 |
| 3 | 635 | 710 | 700 | 660 | 635 |
| Intake Air | 88 | 95 | 99 | 98 | 90 |
| Diesel Fuel | 98 | 105 | 110 | 112 | 100 |
| Pressures: | | | | | |
| Propane (p.s.i.g.) | 12 | 10.5 | 10.5 | 10.5 | 11.0 |
| Lube Oil (p.s.i.g.) | 50 | 50 | 50 | 50 | 50 |
| Barometer (in. Hg) | 29.299 | | | | |
| Pilot Oil (p.s.i.g.) | 47 | 45 | 45 | 44 | 47 |
| Air Box (in. Hg) | 7.3 | 6.8 | 6.7 | 6.7 | 7.3 |
| Exhaust (in. Hg) | 0.30 | 0.55 | 0.55 | 0.55 | 0.60 |
| Corrected Propane (c.f.m.) | 5.70 | | | 5.82 | 5.33 |

Pilot oil charge 12.7 cu. mm./cylinder.
33.3%, 40.0%, and 50.0% gasoline in pilot oil would not ignite charge.

Table 2

EFFECT OF PARAFFINIC GASOLINE CONCENTRATION IN PILOT OIL WITH SIMULATED WET NATURAL GAS "A"[1] AS PRIMARY FUEL

| Run | 1 | 2 | 3 | 4 | 5 |
|---|---|---|---|---|---|
| Engine Speed (r.p.m.) | 1,600 | 1,600 | 1,600 | 1,600 | 1,600 |
| Load (lbs.) | 126 | 136 | 135 | 133 | 130 |
| B.H.P. | 67.2 | 72.5 | 72.0 | 70.8 | 69.3 |
| B.H.P. Increase (percent) | | 7.3 | 7.2 | 5.4 | 3.1 |
| Vol. Gasoline in Pilot Oil (percent) | 0 | 25.0 | 20.0 | 10.0 | 5.0 |
| Temperatures (°F.): | | | | | |
| Water Out | 200 | 200 | 200 | 200 | 200 |
| Lube Oil Sump | 223 | 223 | 221 | 223 | 223 |
| Dry Natural Gas | 92 | 96 | 98 | 98 | 98 |
| Propane Gas | 150 | 155 | 151 | 152 | 152 |
| Wet Bulb | 71 | | | | |
| Dry Bulb | 89 | | | | |
| Exhaust Cyl.— | | | | | |
| 1 | 625 | 675 | 670 | 660 | 640 |
| 2 | 700 | 775 | 755 | 750 | 720 |
| 3 | 625 | 650 | 665 | 655 | 640 |
| Intake Air | 99 | 99 | 101 | 99 | 100 |
| Pressures: | | | | | |
| Natural Gas (p.s.i.g.) | 13.0 | 13.0 | 13.0 | 13.0 | 13.0 |
| Propane (p.s.i.g.) | 10.0 | 10.0 | 10.0 | 10.0 | 10.0 |
| Lube Oil (p.s.i.g.) | 50.0 | 50.0 | 50.0 | 50.0 | 50.0 |
| Baro. (in. Hg) | 29.387 | | | | |
| Pilot Oil (p.s.i.g.) | 46 | 46 | 46 | 46 | 46 |
| Air Box (in. Hg) | 7.1 | 6.9 | 6.9 | 7.0 | 7.0 |
| Exhaust (in. Hg) | 0.55 | 0.55 | 0.55 | 0.55 | 0.55 |
| Dry Corrected Natural Gas (c.f.m.) | 2.84 | 3.53 | 3.52 | 3.70 | 3.52 |
| Corrected Propane (c.f.m.) | 4.31 | 4.62 | 4.58 | 4.58 | 4.37 |

Pilot oil charge 12.7 cu. mm./cylinder.
33.3% gasoline in pilot oil would not ignite charge.
[1] Simulated wet gas "A" composed of 56.6% $C_3H_8$ and 43.4% 0.66 sp. gr. dry natural gas.

Table 3

EFFECT OF PARAFFINIC GASOLINE CONCENTRATION IN PILOT OIL WITH SIMULATED WET NATURAL GAS "B"[1] AS PRIMARY FUEL

| Run | 1 | 2 | 3 | 4 |
|---|---|---|---|---|
| Engine Speed (r.p.m.) | 1,600 | 1,600 | 1,600 | 1,600 |
| Load (lbs.) | 126 | 130 | 129 | 128 |
| B.H.P. | 67.2 | 69.3 | 68.8 | 68.3 |
| B.H.P. Increase (percent) | | 3.1 | 2.4 | 1.6 |
| Vol. Gasoline in Pilot Oil (percent) | 0 | 20.0 | 10.0 | 5.0 |
| Temperatures °F.: | | | | |
| Water Out | 201 | 201 | 201 | 201 |
| Lube Oil Sump | 206 | 205 | 205 | 205 |
| Dry Natural Gas | 89 | 91 | 92 | 93 |
| N-Butane Gas | 132 | 126 | 142 | 130 |
| Wet Bulb | 77 | 78 | 78 | 78 |
| Dry Bulb | 89 | 90 | 93 | 93 |
| Exhaust Cyl.— | | | | |
| 1 | 635 | 660 | 650 | 645 |
| 2 | 710 | 740 | 735 | 725 |
| 3 | 625 | 645 | 640 | 635 |
| Intake Air | 92 | 92 | 94 | 95 |
| Pressures: | | | | |
| Dry Natural Gas (p.s.i.g.) | 13.0 | 13.0 | 13.0 | 13.0 |
| N-Butane Gas (p.s.i.g.) | 8.5 | 8.0 | 8.0 | 8.0 |
| Lube Oil (p.s.i.g.) | 50 | 50 | 50 | 50 |
| Baro. (in. Hg) | 29.329 | | | |
| Pilot Oil (p.s.i.g.) | 46 | 45 | 45 | 45 |
| Air Box (in. Hg) | 7.2 | 7.1 | 7.1 | 7.2 |
| Exhaust (in. Hg) | 0.55 | 0.55 | 0.55 | 0.55 |
| Corrected Dry Natural Gas (c.f.m.) | 9.67 | 11.48 | 11.30 | 10.25 |
| Corrected N-Butane Gas (c.f.m.) | 1.49 | 1.35 | 1.47 | 1.34 |

Pilot oil charge 12.7 cu. mm./cylinder.
25.0% gasoline in pilot oil would not ignite charge.
[1] Simulated wet gas "B" composed of 11.7% $N-C_4H_{10}$ and 88.3% 0.66 sp. gr. dry natural gas.

(BTDC) and completed at about 3° BTDC. The gaseous fuel was inducted into the cylinder 48° before bottom dead center (BBDC) and continued until about 48° after top dead center (ATDC). Ignition of the gaseous fuel took place at approximately 15° after top dead center (ATDC).

Results shown in Table 1 indicate that 25 percent gasoline in pilot oil increased the knock-limited brake horsepower with propane by 9.9 percent over straight pilot oil. Concentrations over 33.3 percent would not ignite the primary fuel charge while concentrations less than 25 percent gave less power. Diesel rated continuous power is 67 at 1600 R.P.M.

Table 2 shows the results when a paraffinic gasoline of regular quality was blended into the pilot oil in various concentrations with a simulated natural gas composed of 43.4 percent 0.66 specific gravity natural gas and 56.6 percent propane. Again 25 percent gasoline appeared to be the optimum concentration in the pilot oil. Results show a 7.3 percent increase in knock-limited brake horsepower.

Table 3 shows the results when a paraffinic gasoline of regular quality was blended into the pilot oil in various concentrations with a simulated wet natural gas composed of 88.3 percent 0.66 specific gravity natural gas and 11.7 percent normal butane. It was determined that 20 percent paraffinic gasoline in the pilot oil was the optimum blend.

EXAMPLE II

The GM 3-71 diesel engine of Example I was operated on a gaseous fuel of propane with a pilot charge of 12.7 cu. mm./cylinder of 51.4 cetane diesel fuel. The knock-limited brake horsepower developed by the engine at 1600 R.P.M.'s was 64.5.

EXAMPLE III

The GM 3-71 diesel engine of Example I was operated on a gaseous fuel of propane with a pilot charge of 12.7 cu. mm. of a diesel fuel containing lead. A 51.4 cetane diesel fuel containing 1.5 milliliters of tetraethyl lead per gallon of fuel was used. The knock-limited brake horsepower developed by the engine at 1600 R.P.M.'s was 65.0. A comparison of the results of Examples II and III indicates that the addition of lead alone to the diesel fuel pilot charge had no appreciable effect on the knock-limited brake horsepower developed by the engine.

As will be evident to those skilled in the art, various modifications of this invention can be made or followed in the light of the foregoing disclosure and discussion without departing from the spirit or scope of the invention.

I claim:

1. A method of operating a dual fuel diesel engine which comprises injecting a pilot charge comprising fuel oil and between about 10 and 30 volume percent gasoline, based on the amount of fuel oil, into a combustion zone containing a compressed mixture of a gaseous hydrocarbon and air, thereby igniting said mixture; burning said mixture within said combustion zone; and exhausting the resulting combustion products from said combustion zone.

2. The method of claim 1 in which said gasoline is unleaded gasoline.

3. The method of claim 1 in which said gasoline contains between 1.5 and 4.0 milliliters of tetraethyl lead per gallon of gasoline.

4. The method of claim 1 in which said gaseous hydrocarbon is dry natural gas.

5. The method of claim 1 in which said gaseous hydrocarbon is wet natural gas.

6. The method of claim 1 in which said gaseous hydrocarbon is propane.

7. A method of operating a dual fuel diesel engine which comprises injecting a gaseous hydrocarbon and air into a combustion zone so as to form a gas-air mixture therein; compressing said mixture in said combustion zone to a temperature at least as high as the ignition temperature of a pilot charge comprising fuel oil and between 10 and 30 volume percent gasoline, based on the amount of fuel oil; injecting said pilot charge into said compressed mixture, thereby igniting same; burning said mixture in said combustion zone, thereby releasing energy; and exhausting the resulting combustion products from said combustion zone.

8. The method of claim 7 in which said gasoline is unleaded gasoline.

9. The method of claim 7 in which said gasoline contains between 1.5 and 4.0 milliliters of tetraethyl lead per gallon of gasoline.

References Cited in the file of this patent

UNITED STATES PATENTS

| | | |
|---|---|---|
| 673,160 | Diesel | Apr. 30, 1901 |

FOREIGN PATENTS

| | | |
|---|---|---|
| 434,631 | Great Britain | Sept. 5, 1935 |
| 7,657 | Great Britain | Dec. 14, 1898 |

OTHER REFERENCES

Internal Combustion Engines—Lichty: page 132 6th edition, 1951, McGraw-Hill Co., New York.